Patented Apr. 30, 1946

2,399,240

UNITED STATES PATENT OFFICE 2,399,240

ALKYLATION OF ISOPARAFFINS WITH OLEFINS

Sumner H. McAllister, Lafayette, and John Anderson and William E. Ross, Berkeley, Calif., assignors to Shell Development Company, San Francisco, Calif., a corporation of Delaware No Drawing. Application January 29, 1942, Serial No. 428,676

9 Claims. (Cl. 260—683.4)

This invention relates to the alkylation of paraffin compounds, particularly paraffins having a tertiary carbon atom, by reaction with an olefin in the presence of acid alkylation catalysts. It deals with a more advantageous alkylation process whereby the quality of the products may be improved and operating costs may be materially reduced, particularly when using normally liquid olefins as the alkylating agent.

One of the principal items of expense in the manufacture of alkylation products by reaction of isoparaffin compounds with olefins in the presence of acid catalysts, such as sulfuric, chlorosulfonic, hydrofluoroboric, hydrofluoric, and like acids, is the cost of catalyst acid which is high because of the relatively short effective life of such catalysts under the usual conditions of reaction, especially with normally liquid olefins. The deterioration or decline in alkylating ability of catalyst acids is usually associated with the formation of undesirable products, particularly higher boiling products, which reduce the yield and quality of the desired alkylation product. While the exact mechanism of the changes responsible for the loss of activity of acid alkylation catalysts is not fully understood and possibly involves both dilution and poisoning effects, a method has been developed which largely overcomes the difficulties formerly associated with such catalyst deterioration.

The process of the invention is based upon the discovery that treatment of the reactants, before contacting them with the alkylation catalyst acid, under conditions adapted to destroy and/or remove compounds more reactive than the olefin or olefins to be used in the alkylation, is capable of materially increasing the effective life of the catalyst acid. In copending application Serial No. 281,882, filed June 29, 1939, the improvement of the life of alkylation catalyst acids by removal of diolefins and acetylenic compounds from the feed stock is described and claimed. Among the methods there disclosed for effecting such removal are polymerization treatments with sulfuric acid, for example, sulfuric acid which has been used in the alkylation step of the process. The present invention deals with an improved method for carrying out alkylation procedures of this general type.

It has now been found that in alkylating isoparaffins and the like with normally liquid olefins unexpected advantages may be obtained by pretreating the olefinic feed stocks with acid under certain carefully controlled conditions. More particularly, it has been discovered that by treatment of the olefinic feed stocks so as to remove along with impurities such as diolefins a small regulated amount of the mono-olefin, not only a material increase in the alkylation catalyst life but also an increase in the yield of alkylation products boiling in the gasoline range as well as in the yield of total alkylation products may be obtained. Specifically, it has been found that improved alkylation results are best obtained by treating amylenes or higher boiling olefins with acid under controlled conditions, contacting the treated hydrocarbons with a base and then distilling the treated hydrocarbons to remove the polymer produced in the pretreatment operations. This method of operation has special advantages over prior alkylation procedures. It gives very much improved catalyst life compared to methods of alkylation in which the polymers are permitted to enter the alkylation stage of the process since, as will be more fully shown hereinafter, the polymers are quite detrimental to alkylation acid catalyst life. The new procedure also gives much higher yields of useful alkylation products than can be obtained by the use of previous polymerization methods prior to alkylation since such methods, in contrast to the invention, remove large amounts of mono-olefin from the alkylation feed stock. Thus, the process of the invention gives improved results based both on the amount of catalyst and of olefin used. Still another important advantage of the process is that by its use the effective life of not only the alkylation acid but also the pretreating acid is extended so that a small amount of pretreating acid only is required and the whole process is made more economical. This is accomplished by carrying out the pretreatment under conditions at which the contamination of the pretreating acid is minimized.

The process of the invention may be applied to the reaction of saturated aliphatic compounds having a hydrogen atom attached to a tertiary carbon atom with normally liquid olefins regardless of the source or method of preparation of the reactants. Saturated compounds which may be reacted in accordance with the invention include, for example, 2-methyl propane, 2-methyl butane, 2- and 3-methyl pentanes 2,3- and 2,4-dimethyl pentanes, 2,2,4-trimethyl pentane, 3-ethyl pentane, methyl cyclopentane and higher homologues and suitable substitution products such, for example, as halogenated paraffins and the like. Compounds which may be reacted with such saturated compounds include olefins such as alpha and beta amylenes, isopropyl ethylene, trimethyl ethylene, unsymmetrical methyl ethyl ethylene, hexylenes including iso- and tertiary-butyl ethylenes, the heptylenes, normal and iso-octylenes, cyclopentene, cyclohexene and analogous higher olefins. Particularly advantageous sources of isoparaffins and olefins which may be used are, for example, hydrocarbons derived from petroleum products, shale oil, coal, peat, animal and vegetable oils, and like carboniferous materials. The isoparaffins and/or olefins present in the starting material may be of natural occurrence or the result of suitable treatment of the parent hydrocarbon. Thus, for example, the isoparaffins may be obtained by isomerization, rearrangement, catalytic reforming or like treatment of normal or less branched chain paraffins, or by suitable treatment, with or without catalysts, of higher boiling materials which may or may not contain isoparaffin, or by hydrogenation of olefin polymers, or by other suitable methods. The olefins used may be the result of catalytic dehydrogenation, liquid or vapor phase cracking, or dehydration of alcohols, or dehydrohalogenation of alkyl halides, or other appropriate methods. Cracked petroleum products including, for example, cracked gasoline and other cracked petroleum distillates and fractions thereof such, for example, as hydrocarbon fractions consisting of, or predominating in, hydrocarbons containing the same number of carbon atoms per molecule may be used although non-isomeric mixtures are also suitable. For the purpose of making the invention more clear its application to the alkylation of isoparaffins with olefinic cracking products in the presence of concentrated sulfuric acid will be emphasized in the detailed description of its method of execution.

In the first step in the new process the olefin-containing hydrocarbon is contacted with a polymerization catalyst, for example, a strong inorganic acid as sulfuric or phosphoric acid or the like, under conditions controlled so as to convert only a small regulated amount of the mono-olefins present; most preferably not more than about 5% by weight of the mono-olefins are polymerized. The conditions to be used in this treatment will depend upon the nature of the hydrocarbons present and the character of the polymerization agent chosen. For the treatment of pentane-amylene fractions of cracked petroleum products, for example, the following conditions have been found to be advantageous when using sulfuric acid as the treating agent:

Contact time, about 1 to 5 minutes, preferably 2 to 3 minutes.
Reaction temperature, about 30° C. to 50° C., preferably 35° C. to 40° C.
Acid concentration, 55% to 70% by weight, preferably 65% by weight.
Acid to hydrocarbon volume ratio, at least 0.5:1, preferably 1-2:1.

These reaction variables are interdependent so that analogous results may be obtained outside the preferred ranges by making suitable adjustments in the other conditions. Thus, for example, an increase in the acid concentration may be compensated for by decreasing the contact time or reaction temperature, or both. With more active polymerizing agents such as aluminum chloride and the like, it is desirable to employ lower temperatures and smaller amounts of treating agents, although the contact time may also be reduced, particularly where vapor phase treating methods are employed. When using less active polymerization agents such, for example, as phosphoric acid or benzene sulfonic acid or antimony trichloride, etc., it is advantageous to use higher temperatures and/or longer contact times to compensate for the lower activity of the treating agent. In treating hydrocarbon fractions containing less active olefins, it is also desirable to somewhat increase the rigor of the treatment. Thus, for example, for the treatment of cracked gasoline of 70° C. end point with an equal volume of 65% sulfuric acid a contact time of 6 to 15 minutes at a reaction temperature of 40° C. to 50° C. is preferred.

Any suitable method of contacting the polymerization agent and olefin-containing hydrocarbon may be employed. For example, the two reactants in the liquid state may be agitated in a mixing device or subjected to concurrent or countercurrent flow in a packed tower or the like. U. S. Patent 2,232,674 describes a method for carrying out reactions which may advantageously be adapted to the first step of the present process. Solid polymerization catalysts suspended in the olefin-containing hydrocarbon may be used in the same way as liquid polymerization agents. Alternatively, the olefin-containing hydrocarbon may be passed in the vapor phase over the catalyst in solid form, using reduced pressure if desired.

After the acid treatment the separated olefin-containing hydrocarbon is preferably treated with a base to neutralize any acid component present therein. This may be accomplished by scrubbing with a preferably dilute solution of caustic soda or ammonia or lime or the like, or by hydrolyzing at about 100° C.–150° C. with such a solution, preferably under conditions at which intimate contact of the hydrocarbon and basic agent is promoted. Instead of carrying out the neutralization as a separate step in the process, it may be effected during the distillation stage as by injecting a 3% caustic soda solution, for example, into the fractionation column used for separating polymerization products from the treated olefins. Whatever method of neutralization or hydrolysis is adopted, the treating agent may be recirculated to the treating unit after separation from the hydrocarbon, the desired concentration or base being maintained by either batch replacement of spent treating solution or continuous or intermittent partial replacement thereof with fresh base. In some cases it is desirable to water-wash the acid-treated hydrocarbon before contacting it with the base in order to prevent emulsification difficulties during the neutralization.

The higher boiling products formed by the treatment of the olefin-containing hydrocarbon are removed prior to contacting the olefin with the alkylation catalyst. Any suitable fractionation method may be used, flash distillation being generally advantageous. The point at which the separation should be effected will depend upon the olefins involved and the conditions of pretreatment used. As a rule it is preferred to distil to about the same end point as that of the starting material, but in some cases it is possible to use higher distillation temperatures at which a part of the lighter reaction products, not higher boiling than dimers of the starting olefin, are included with the latter. The higher boiling hydrocarbons separated in the distillation are not a loss in the process but are high octane materials which are suitable for use in motor fuel. They are undesirable components of the alkylation feed, however, it having been found that olefin-containing hydrocarbon which had been acid-treated and water- and caustic-washed gave only a small improvement in alkylation compared with the same hydrocarbon which had been redistilled after similar treatment.

Any suitable method of reacting paraffins with olefins and the like in the presence of acid alkylation catalysts may be used in the alkylation step of the process. The alkylation may be carried out with either or both reactants in the vapor phase, but liquid phase reaction is preferred. Any suitable method of intimately mixing the reactants and catalyst acid may be employed. For example, jet mixers, towers provided with suitable baffles or packing, power-driven mixers and the like may be used. For large scale, continuous operation mixing by means of a pump which is in communication with a separator wherein reaction products may be separated at least in part from catalyst acid and the latter returned to the reaction, preferably together with a part of the separated product-containing phase to which fresh reactants are added before being contacted with catalyst acid, is advantageous. A preferred method of operation which is more fully described and claimed in copending application of Sumner H. McAllister, Serial No. 245,714, filed December 14, 1939, comprises circulation of a stream of reacted mixture containing unreacted isoparaffin and continuously feeding into the mixture isoparaffin and olefin to be reacted therewith, the former preferably in molecular excess, while taking off from the circulating emulsion reacted mixture from which product equivalent to the feed is withdrawn and the remainder returned to the system. Preferably a molecular excess of isoparaffin over olefin is used in the reaction and most preferably the pretreated olefin is mixed with a molecular excess of isoparaffin before it is contacted with catalyst acid.

The conditions of alkylation which will be most desirable in any particular case will depend upon the nature of the isoparaffin and olefin involved. Where sulfuric acid is employed as the catalyst, initial concentrations of about 90% to 100% may be used although fuming $H_2SO_4$ is also suitable provided lower reaction temperatures are used. Temperatures of the order of about 5° C. to 50° C. may be used. The proportion of catalyst to hydrocarbon which will be desirable will depend upon the olefin being reacted. In general, volume ratios of about .5:1.0 to about 4:1 are suitable. Reaction times of about five to thirty-five minutes are preferred but may be varied depending upon the type of apparatus and method of operation from a fraction of a minute to as much as 60 minutes. Most preferably molar ratios of isoparaffin to olefin of at least 20:1 are used in the reaction mixture in order to favor alkylation and to suppress undesirable reactions such as olefin polymerization, and it is usually advantageous to use ratios of the order of 50:1 to 500:1 at the point where the olefin first contacts the acid. While the same ratio of paraffin to olefin may be used in the feed as is employed in the reaction, when the preferred method of feeding reaction mixture into recirculated reaction product is used, ratios of isoparaffin to olefin of about 3:1 to 20:1 in the feed are preferred. Single or multiple stage alkylation with either concurrent or countercurrent flow of reactants and catalyst may be used with either batchwise, intermittent or continuous operation.

The following examples illustrate the advantages of the process of the invention and show how it may be carried out:

EXAMPLE I

An amylene-pentane fraction from Dubbs cracked gasoline was used as olefinic feed for the alkylation of isobutane. The amylene-pentane fraction had an end point of 50° C., a diene number of 28 (mg. maleic anhydride per 100 ml. of hydrocarbon), a bromine number of 121, and contained 0.019% total sulfur. The amylene-pentane fraction was pretreated with sulfuric acid in a bronze rotary-type mixer connected to a separator from which an acid return line led back to the mixer. The mixer and separator were first charged with the requisite amount of acid, the valve in the acid return line being closed. The mixer was then filled with amylene-pentane and started. After the initial charge had received sufficient contact, the remainder of the amylene-pentane was forced into the mixer at the proper rate and the acid return valve was opened sufficiently to keep the acid at the proper level in the separator. The pumping action of the mixer carried the acid and hydrocarbon mixture to the separator. The treated amylene-pentane was run from the separator into an accumulator from which it was withdrawn for washing, neutralization or distillation, etc., prior to use in alkylation as described below.

The alkylation was carried out in an identical apparatus, which in this case was initially charged with 99.7%–100% sulfuric acid and isobutane. After starting the mixer isobutane and amylene-pentane were fed in through a rotameter to measure the volume of the added hydrocarbon. The hydrocarbon phase from the separator was bled off through a regulating valve into a stripping column, from which crude alkylate was obtained as bottoms. The stabilized alkylate was refractionated to separate an aviation gasoline cut, the octane number of which was determined.

*Pretreatment*

| | | | | | |
|---|---|---|---|---|---|
| Acid concentration____percent__ | None | 63 | 63 | 65 | 65 |
| Contact time_____minutes___ | None | 6–7 | 6–7 | 6–7 | 6–7 |
| Temperature_____° C__ | None | 10 | 10 | 40 | 40 |
| Acid to hydrocarbon volume ratio in mixer_____ | None | 1/1 | 1/1 | 1/1 | 1/1 |
| End point after redistillation ° C__ | (¹) | (¹) | 40 | 40 | (²) |
| Lbs. amylene-pentane treated per lb. of acid_____ | None | 9.7 | 9.7 | 10.5 | 10.0 |
| Wt. percent amylene-pentane recovered_____ | _____ | 95.5 | 95.5 | 100 | 100 |
| Wt. percent amylene-pentane absorbed by acid_____ | _____ | ca. 3.6 | ca. 3.6 | 1.0 | <1.0 |
| Wt. percent polymers produced boiling above 50° C_____ | _____ | 4–5 | 4–5 | 9–10 | 9 |
| Percent $H_2SO_4$ in acid phase after treatment_____ | _____ | 47.0 | 47.0 | 59.5 | 60.3 |

*Alkylation*

| | | | | | |
|---|---|---|---|---|---|
| Wt. per cent amylene-pentane in feed_____ | 16.3 | 16.5 | 16.5 | 16.9 | 16.9 |
| Wt. percent isobutane in feed__ | 72.3 | 72.8 | 73.4 | 77.5 | 77.5 |
| Wt. percent normal butane in feed_____ | 11.4 | 10.7 | 10.1 | 5.6 | 5.6 |
| Wt. percent yield of total alkylate_____ | 137 | 136 | 139 | 144 | 137 |
| Average wt. percent of 15°–150° C. cut in alkylate at 85 percent alkylation acid acidity__ | 90.0 | 92.2 | 94.0 | 94.0 | 92.0 |
| Octane No. of 15°–150° C. cut of alkylate_____ | 84.0 | 84.5 | 85.0 | 86.0 | 85.5 |
| Alkylation acid life in volumes of aklylate per volume of alkylation acid at 85 percent acidity_____ | 8.0 | 9.5 | 16.0 | 20.0 | 10.0 |

¹ Not distilled.
² Caustic washed but not distilled.

In all cases the alkylation was carried out using a hydrocarbon feed rate of 1.8-2.1 volumes per hour per volume of reactor space, a contact time of 18-20 minutes in the reactor, and a temperature of 10° C. The feed contained 10-11 mols of isobutane per mol of olefin and equal volumes of acid and hydrocarbon were maintained in the reactor. The results clearly show the improvements, particularly in alkylation acid life which may be obtained by pretreating olefinic feed stocks with acid, neutralizing and distilling prior to use of the olefins in alkylation.

A particularly advantageous treating agent is spent alkylation acid. Using such acid diluted to 65.5% and extracted with butane, we have obtained results equal to those secured with fresh acid.

Using the same apparatus as employed for the tests of Example I, a cracked gasoline of 70° C. end point was used for alkylation of isobutane. The gasoline consisted of about 60% by weight of hydrocarbons of five carbon atoms per molecule and 40% by weight of hydrocarbons having six carbon atoms per molecule. The bromine number of the gasoline was 128.5 indicating about 60% of olefins, while the diene number of 17.2 indicated about 2% diolefins. This gasoline was treated at 40° C. with two volumes of sulfuric acid of 65% concentration per volume of hydrocarbon using an average contact time of 6-7 minutes, 8.9 pounds of hydrocarbon being treated per pound of acid used. The gasoline absorbed by the acid was less than 0.5% and 96% of the gasoline was recovered. The treated gasoline was washed with 5% sodium hydroxide solution and then distilled to an end point of 80° C. to exclude the polymers produced. Using a feed containing 18.5% of the treated gasoline, 75.7% of isobutane and 5.8% of normal butane and propane, the alkylation was carried out in the presence of a volume of sulfuric acid of 100% initial concentration equal to the volume of hydrocarbon in the reactor. A mol ratio of isobutane to olefin of 10:1 was present in the feed. The alkylation temperature was 10° C. and the contact time averaged 20 minutes. The same gasoline was similarly reacted without pretreatment. The following are the comparative results obtained:

EXAMPLE II

|  | Untreated gasoline | Acid-treated, neutralized and redistilled gasoline |
| --- | --- | --- |
|  | Per cent | Per cent |
| Weight per cent yield of total alkylate | 125 | 143 |
| Average weight per cent of 15°-150° C. cut in total alkylate at 85% alkylation acid acidity | 82.3 | 84.8 |
| Overall yield of 15°-150° C. cut | 103 | 110 |
| Overall yield of 40°-150° C. cut | 77.5 | 81.0 |
| Alkylation acid life at 85% acidity | 6.0 | 14.0 |

EXAMPLE III

In plant scale tests of the process using amylene-pentane recovered from 100° C. end point cracked gasoline, the olefinic feed was treated with an equal volume of 65% sulfuric acid at 35° C. for 2 to 3 minutes, then flash distilled while injecting about 1 volume of 3% sodium hydroxide solution for each six volumes of hydrocarbon. Under these conditions 3% to 5% of higher boiling polymers were formed. In alkylation using an isobutane to olefin ratio of 14 to 1 and a contact time of 20 minutes, a yield of 1.85 volumes of alkylate per volume of olefin was obtained. The octane number of the depentanized alkylate of 126° C. end point was 92.5. An acid life of 20 volumes of product per volume of acid was obtained compared to only 7 volumes when the same fraction was used without pretreatment.

The life of the pretreating acid is quite long under the preferred operating conditions. Thus, in large scale tests of the process the acid consumption averaged only about one pound of $H_2SO_4$ per barrel of amylene-pentane fraction treated. It will be apparent, therefore, that the process offers many advantages over prior alkylation methods. These advantages may be realized under a wide variety of treating conditions using widely different acid treating agents, regardless of the alkylation method employed and the nature of the tertiary carbon atom-containing compound being alkylated or the liquid olefin or olefins used as alkylating agent. It will consequently be clear that the invention is not limited to the details of operation disclosed by way of illustration nor by any theory suggested in explanation of the greatly improved results obtained.

This application is a continuation-in-part of copending application Serial No. 281,882, filed June 29, 1939.

We claim as our invention:

1. A process of producing higher boiling saturated hydrocarbons by alkylating isobutane with an amylene which comprises contacting an amylene-pentane fraction of hydrocarbon cracking products with sulfuric acid of 60% to 70% concentration at between about 30° C. and about 50° C. for 1 to 5 minutes while maintaining a volume ratio of acid to hydrocarbon in the reaction mixture of at least 0.5 to 1, intimately contacting the acid-treated hydrocarbon with a dilute sodium hydroxide solution, distilling the neutralized hydrocarbon to separate a fraction of substantially the same end point as the original amylene-pentane fraction, and emulsifying the amylene content of the thus-separated fraction and isobutane with sulfuric acid of 90% to 100% concentration on a hydrocarbon-free basis while maintaining the ratio of isobutane to olefin at the point at which the olefin first contacts the acid between 50:1 and 500:1, whereby alkylation of the isobutane by said olefin is effected and polymerization is suppressed.

2. A process of producing higher boiling saturated hydrocarbons by alkylating isobutane with a normally liquid olefin which comprises contacting a mixture of hydrocarbon cracking products comprising said olefin with sulfuric acid of 55% to 70% concentration at between 30° C. and 50° C. for 1 to 15 minutes while maintaining a volume ratio of acid to hydrocarbon of at least 0.5 to 1, neutralizing and distilling the acid-treated hydrocarbon to separate higher boiling components therefrom, and emulsifying remaining normally liquid olefin and isobutane with concentrated sulfuric acid while maintaining the ratio of isobutane to olefin at the point at which the olefin first contacts the acid between 50:1 and 500:1, whereby alkylation of the isobutane by said olefin is effected and polymerization is suppressed.

3. A process of producing higher boiling saturated hydrocarbons by alkylating an isoparaffin with an olefin which comprises contacting a normally liquid fraction of hydrocarbon cracking products containing said olefin with at least half its volume of a 55% to 70% solution of a strong inorganic acid at between 30° C. and 50° C. for 1 to 15 minutes, distilling the acid-treated hydrocarbon to separate therefrom at least the higher boiling hydrocarbons formed by the acid treatment, and emulsifying remaining normally liquid olefin and said isoparaffin with a liquid acid alkylation catalyst under alkylating conditions.

4. A process of producing higher boiling saturated hydrocarbons by alkylating an aliphatic saturated hydrocarbon having a tertiary carbon atom with an olefin which comprises contacting hydrocarbon containing a normally liquid olefin and the corresponding diolefin with an acid polymerization catalyst at a temperature at which interpolymerization of said olefin with said diolefin is effected without converting more than 5% of the mono-olefins present, distilling the acid-treated hydrocarbon to separate therefrom, at least the diolefin polymerization products, and emulsifying remaining normally liquid olefin and said saturated tertiary hydrocarbon with a liquid acid alkylation catalyst under alkylating conditions.

5. A process of producing higher boiling saturated hydrocarbons by alkylating an isoparaffin with an olefin which comprises contacting a normally liquid fraction of hydrocarbon cracking products containing said olefin with a solution of an acid polymerization catalyst at a temperature at which polymerization of a part of the mono-olefin content of said fraction not greater than 5% of the total olefin content takes place without substantial dilution of the acid solution, removing at least the polymerization products from the acid-treated hydrocarbon, and emulsifying remaining normally liquid olefin and said isoparaffin with a liquid acid alkylation catalyst under alkylating conditions.

6. A process of producing higher boiling saturated hydrocarbons by alkylating an aliphatic saturated hydrocarbon having a tertiary carbon atom with an olefin which comprises contacting hydrocarbon containing a normally liquid olefin and the corresponding diolefin with a polymerization catalyst to substantially polymerize diolefins together with between 1% and 5% of the mono-olefin content, removing polymerization products from the resulting hydrocarbon mixture, and emulsifying remaining normally liquid olefin and said saturated tertiary hydrocarbon with a liquid acid alkylation catalyst under alkylating conditions.

7. A process of producing higher boiling saturated hydrocarbons by alkylating an isoparaffin with a normally liquid mono-olefin which comprises contacting said isoparaffin and olefin with concentrated sulfuric acid under alkylation conditions, separating used sulfuric acid from the reaction mixture, diluting a part of said separated acid to a concentration between 55% and 70% and contacting a fraction of hydrocarbon cracking products containing said olefin with said diluted acid at between 30° C. and 50° C. for 1 to 15 minutes while maintaining a volume ratio of acid phase to hydrocarbon of at least 0.5 to 1, neutralizing and distilling the acid treated hydrocarbon to separate a fraction of substantially the same end point as the fraction treated and feeding the separated fraction to said alkylation whereby the effective life of the sulfuric acid catalyst is materially increased and the yield and quality of the alkylation products are improved.

8. A process of producing higher boiling saturated hydrocarbons by alkylating an isoparaffin with a normally liquid mono-olefin which comprises contacting said isoparaffin and olefin with concentrated sulfuric acid under alkylation conditions, separating used sulfuric acid from the reaction mixture, contacting a hydrocarbon mixture comprising said olefin and a normally liquid diolefin with a part of said separated used acid to substantially polymerize the diolefin content together with a minor amount of the mono-olefin present, removing the polymerization products from the acid treated hydrocarbon and feeding said hydrocarbon to said alkylation whereby the effective life of the sulfuric acid catalyst is materially increased and the yield and quality of the alkylation products are improved.

9. A process of producing higher boiling saturated hydrocarbons by alkylating an aliphatic saturated hydrocarbon having a tertiary carbon atom with a normally liquid olefin which comprises contacting a normally liquid fraction of hydrocarbon cracking products containing said olefin with used sulfuric acid from an alkylation operation while maintaining polymerization conditions at which between about 1% and about 5% of the mono-olefin content is polymerized, distilling the acid treated hydrocarbon to separate polymerization products therefrom and emulsifying the polymer-free product and a molecular excess of said aliphatic saturated hydrocarbon having a tertiary carbon atom with concentrated sulfuric acid under alkylating conditions whereby the effective life of the sulfuric acid in said alkylation and the yield and quality of the alkylation products are improved.

SUMNER H. McALLISTER.
JOHN ANDERSON.
WILLIAM E. ROSS.